United States Patent
Floeter

(10) Patent No.: US 7,108,888 B2
(45) Date of Patent: Sep. 19, 2006

(54) TRIGLYCERIDE FAT

(75) Inventor: Eckhard Floeter, Vlaardingen (NL)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 333 days.

(21) Appl. No.: 10/442,766

(22) Filed: May 21, 2003

(65) Prior Publication Data

US 2004/0071856 A1   Apr. 15, 2004

(51) Int. Cl.
*A23D 7/00* (2006.01)

(52) U.S. Cl. ............................ 426/603; 426/607

(58) Field of Classification Search .................. None
See application file for complete search history.

(56) References Cited

U.S. PATENT DOCUMENTS

| | | | | |
|---|---|---|---|---|
| 2,442,536 A | * | 8/1948 | Eckey | 426/601 |
| 3,859,447 A | * | 1/1975 | Sreenivasan | 426/73 |
| 4,940,845 A | * | 7/1990 | Hirota et al. | 435/134 |
| 5,786,019 A | * | 7/1998 | Cain et al. | 426/607 |
| 6,022,577 A | | 2/2000 | Chrysam et al. | |
| 6,238,723 B1 | | 5/2001 | Sassen et al. | |
| 6,777,018 B1 | * | 8/2004 | Floeter et al. | 426/603 |
| 2002/0122868 A1 | * | 9/2002 | Floeter et al. | 426/602 |

FOREIGN PATENT DOCUMENTS

| | | | |
|---|---|---|---|
| BE | 904 628 | | 8/1986 |
| JP | 0321227 | * | 12/1988 |
| NL | 0185524 | * | 12/1985 |
| WO | 97/28695 | | 8/1997 |
| WO | WO 02/41699 | * | 10/2001 |
| WO | 02/41698 | | 5/2002 |
| WO | 02/41699 | | 5/2002 |

OTHER PUBLICATIONS

International Search Report for PCT/EP 03/04742 mailed Sep. 23, 2003.
European Search Report for EP Application No. 02 07 6963 mailed Nov. 20, 2002.
Adomako, D; *Fatty Acid Composition and Characteristics of Pentadesma butyracea Fat Extracted from Ghana Seeds*, Journal of theScience of Food and Agriculture, Elsevier Applied Science Publishers, vol. 28, 1977, pp. 384-386.
Yella Reddy et al., *Cocoa Butter Extenders from Kokum (Garcinia Indica) and Phulwara (Madhuca Butyracea) Butter*, Journal of the American Oil Chemists'Society, American Oil Chemists' Society, vol. 71, No. 2 (1994).
Co-pending application for Floeter et al.; U.S. Appl. No. 10/043,823; filed Nov. 20, 2001.
Co-pending application for Floeter et al.; U.S. Appl. No. 10/045,405; filed Nov. 20, 2001.

* cited by examiner

*Primary Examiner*—Carolyn Paden
(74) *Attorney, Agent, or Firm*—Gerald J. McGowan, Jr.

(57) ABSTRACT

Process for the preparation of an edible triglyceride fat which is able to structure a liquid oil which process comprises the steps
selecting a triglyceride fat A and a triglyceride fat B, interesterifying a mixture containing fat A and fat B in a ratio chosen from the range 80:20 to 20:80,
where fat A is a fat which is natural and which contains at least 35 wt. % of stearic acid residues and less than 5 wt. % residues of polyunsaturated fatty acids and
where fat B contains at least 40 wt. % of saturated fatty acid residues with a chain length of 12 or 14 carbon atoms and which process is characterized in that fat A is selected from the group consisting of Allanblackia fat, Pentadesma fat, Kokum fat and Sonchy fat. The resulting fat enables the preparation of a natural fat phase for use in spread manufacture.

15 Claims, No Drawings

TRIGLYCERIDE FAT

FIELD OF THE INVENTION

The present invention deals with a process for the preparation of a hardstock fat suitable for structuring a liquid fat phase.

BACKGROUND AND THE RELATED ART

Natural vegetable fats predominantly have a liquid consistency at ambient temperature. When a more solid consistency is needed, e.g. for the manufacture of plastic emulsion spreads, a hardstock fat is incorporated in the oil. In a processed W/O-emulsion spread the oil phase consists of a liquid oil which is structured with a lattice of hardstock fat crystals. By structuring the fat phase the spread obtains the desired plasticity and emulsion stability. The quality of the hardstock fat and the amount needed for oil structuring are inversely related.

Natural vegetable fats which have hardstock functionality are rare. Natural fats in the context of this specification are fats which as such are present in their non-genetically modifified source organism, particularly in the seeds or fruits of particular plants. For acting as hardstock fat such non-processed vegetable fats usually lack the necessary high content of saturated fatty acids with a chain length of at least 16 carbon atoms. Shea fat, cocoa butter and palm oil are the few examples of fats containing a substantial amount of saturated fatty acid.

Cocoa butter is the only unprocessed fat which contains a relatively high amount of saturated fatty acid and which as such has been used for margarine production. However, use of cocoa butter as hardstock fat for spread preparation entails serious disadvantages. Cocoa butter has a high content of palmitic acid. Further, products prepared with cocoa butter suffer from severe re-crystallisation phenomena. In chocolate these become apparent as fat blooming. Coarse grains are feared in spread preparation since these would easily spoil the product's consistency. Finally, cocoa butter generally is too expensive to serve as hardstock fat in margarine manufacture.

Palm oil to the contrary is cheap, but has other disadvantages. It needs modification before it is suited for use as first class hardstock fat. On its own its structuring functionality is insufficient for the manufacture of good products. The relatively low level of saturated fatty acids (<50 wt. %), their unfavourable distribution over the constituting triacylglycerides and the relatively high content (>15 wt. %) of polyunsaturated fatty acids make it necessary to subject palm oil to an oil modification process. Besides its insufficient structuring ability, palm oil also suffers from the abundant presence of POP and PPO type triglycerides that post-crystallize as undesired fat grains in the final fat spread.

So palm oil has to be subjected to either hydrogenation or fractionation in order to increase the level of saturated fatty acids. Both techniques result in structuring fats which cause a prohibitively bad oral response. Consequently, the resulting fats are typically used only as a supplement to other main hardstock fats or as a component in an interesterification mixture. Such interesterification mixture usually contains a further fat rich in medium chain (C12 or C14) saturated fatty acids such as palmkernel fat or coconut fat. In this way effectively structuring fat compositions can be manufactured. They typically contain as main structuring triglycerides the triglyceride categories HHH, H2M, H2U, and HM2, where H denotes saturated fatty acid residues with more than 15 carbon atoms, M saturated fatty acid residues with 12 or 14 carbon atoms (the above mentioned medium chain saturated fatty acids) and U any unsaturated fatty acid residue with more than 15 carbon atoms.

The properties of the resulting interesterified triglyceride mixture can be manipulated by the man skilled in the art through a proper choice of the three involved fat types: the fat containing medium chain triglycerides, the fat with a high content of palmitic acid residues and, optionally, the liquid oil such as rapeseed oil or sunflower oil. With a high palm fat component, said manipulation yields a triglyceride profile in which palmitic acid residues predominantly are the fatty acid residues denoted as H, the residues M predominantly are lauric acid residues and the fatty acid residues of the group U contain significant portions of both mono- and polyunsaturated C17+ fatty acid residues.

One of the options to vary the the medium chain triglycerides containing fat has been described in U.S. Pat. No. 6,238,723. Use is made of high lauric rapeseed oil which has resulted from biotechnological developments based on genetical modification of rapeseed. The high lauric oil is interesterified with a fat with a high content of C16+ fatty acids, such as palmitic acid or stearic acid. Only fats which have been hydrogenated or fats which have been obtained by genetical modification have been indicated to be suitable for such interesterification.

Although with palm oil after proper modification a hardstock fat can be obtained which is quite satisfactory from the point of view of good structuring ability and of ensuring a good mouthfeel of the final spread product, this natural fat, just like cocoa butter, unfortunately suffers from an undesirably high content of palmitic acid.

A high content of palmitic acid residues has been established to contribute to a high Keys value. A fat's Keys number, is a measure for the nutritional effect of fat intake on blood cholesterol level and thus is a risk indicator for affecting cardiovascular health. A high Keys value means that consumption of the fat adversely affects the blood cholesterol level.

A structuring fat necessarily contains a high level of saturated fatty acid. However, the only option for avoiding palmitic acid is stearic acid.

Presently, raising the content of stearic acid residues in a vegetable fat can be accomplished only by hydrogenating an unsaturated vegetable oil, by fractionation of specific vegetable fats or by genetical modification of the oil source plant. Hydrogenation, however, presently is avoided for fat processing since it conflicts with the naturalness requirement. Equally oils resulting from genetical modification are qualified as non-natural. The use of fractionation as described hereinbefore for the upgrading of palm oil, is not desired either, since such fractionation inherently results in the generation of a secondary product stream which has to be disposed of. Moreover the only vegetable stearic acid containing fat which delivers a suitable fractionated fat is said shea fat and not without necessarily refining by wet fractionation which process is considered non-natural and which makes shea fat too expensive for use in common spread manufacture.

According to co-pending not-prepublished patent applications EP00204120.0 and EP01201916.2 it was found that some natural high stearic fats are suited as hardstock fat for the preparation of edible W/O-emulsion spreads. Although the fats as such were known since long, their use for the manufacture of edible emulsion spreads was not yet recognized and particularly not their oil structuring ability.

Surprisingly, these fats, when refined, can be used without any modification. Fractionation is mentioned as an option, where the natural variant, particularly dry fractionation is preferred.

Patent application WO 97/28695 discloses an interesterification process which employs as sole fat a non-hydrogenated high stearic oil. Its content of stearic acid residue is 15–45%. The process delivers specific fat compositions with a favourable ratio of (HHO+HOH) to (HHL+HLH) triglycerides which is <1.0.

O denotes oleic acid residues and L residues of polyunsaturated fatty acids. H is as defined before. When selecting the high stearic starting oil, only an oil obtained by genetical modification has been indicated. Application of this procedure to the high stearic fats mentioned in patent applications EP00204120.0 and EP01201916.2, yields hardstock fats which cause a prohibitively bad mouthfeel and a ratio of (HHO+HOH) to (HHL+HLH) triglycerides >1.0.

The present invention provides oils which have been obtained neither by hydrogenation nor by genetical modification. It provides a process for modifying and improving the structuring quality, the manufacturability and processability of high stearic fats, which process may be qualified as natural.

SUMMARY OF THE INVENTION

We have found that interesterifying specific high stearic triglyceride fats with a fat having a high content of lauric acid or myristic acid residues namely at least 40 wt. % 0/0 of saturated fatty acid residues with a chain length of 12 or 14 carbon atoms, results in substantial product and manufacturing benefits.

DETAILS OF THE INVENTION

The present invention enables modification and improvement of the structuring properties of specific natural high stearic fats without relying on the use of fat hydrogenation or of genetically modified fat sources.

The starting fats used in the present invention are selected from the group consisting of Allanblackia fat, Pentadesma fat, Kokum fat and Sonchy fat. Their content of stearic acid residues exceeds 35 wt. % and the fats contain an extremely low content (<5 wt. %) of polyunsaturated fatty acid residues. Preferably a fat is selected which contains at least 40 wt. %, more preferably at least 50 wt. % of stearic acid residues. Said fats include their fractions as obtained by a dry fractionation process.

Said fats are denoted as natural. Natural fats are fats which as such are present in their source organism, particularly in the seeds or fruits of particular plants. The plant has not been obtained by genetical modification techniques other than traditional breeding. Purification (refining) of the fat or submitting it to dry fractionation (without use of solvents) does not change its status of naturalness.

The invention comprises the interesterification of one of those fats (A) with a fat B which contains at least 40 wt. %, preferably at least 60 wt. % of saturated fatty acid residues with a chain length of 12 or 14 carbon atoms. Preferably fat B is a natural fat such as palm kernel fat, coconut fat or fractions of those fats.

In the interesterification mixture the fats A and B are present in a ratio which preferably is 70:30 to 30:70, more preferably 60:40 to 40:60. Optionally, but subject to said ratios, the interesterification mixture contains further fat components.

The conditions for interesterification are as usual and are well known to the man skilled in the art. Preferably, interesterification is carried out using an enzymatic process. Since such process qualifies as natural and the starting fats are natural too, the fats obtained by enzymatic interesterification may be denoted as natural hardstock fats.

Dependent on the type of enzyme, enzymatic interesterification may result in a rearrangement of fatty acid residues which is different from the result of chemical interesterification. Hence, starting from the same mixture, hardstock fats resulting from both processes may have different properties.

For the interesterification of fats A and B either fat A or fat B or both may be wholly or partially be substituted by fractions of those fats.

The fats resulting from the present invention contain a high content of triglycerides of the type HHH, H2M, H2U and HM2 which are known for their fat phase structuring functionality at ambient and elevated temperatures.

Preferably their level is at least 20 wt. %, more preferably at least 25 wt. % of the total triglycerides content of the interesterified fat. The fats show a relatively low content of HHH triglycerides which cause an undesirable waxy mouthfeel. Preferably, the ratio of the total amount of said structuring triglycerides to HHH triglycerides is at least 4, more preferably at least 5.

The fats obtained according to the present invention, when employed for the manufacture of fat spreads, show the aimed excellent mouthfeel, efficient product structuring ability and good taste stability. What is even more important, however, is that they possess the unique combination of naturalness and a health supporting low Keys number.

A further benefit of the high stearic fats resulting from the invented process is a relatively low caloric value. In the digestive tract stearic acid forms bile salts which are less easily absorbed from the intestines than the bile salts of palmitic acid.

A further embodiment of the invention comprises a fat phase suited for the manufacture of food products of the water in oil emulsion type which fat phase consists of a vegetable oil and 25–80 wt. %, preferably 30–60 wt. % of the hardstock fat obtained according to the invention. The fat phase preferably has a solid fat content as established according to standard pulse NMR techniques being less than 4% at 35° C. and more than 10% at 20° C.

The invention also comprises food compositions for which preparation a fat prepared according to the invention has been employed.

Such food composition preferably is a fat continuous emulsion spread such as margarine and corresponding reduced fat spreads having a fat content of 30–80 wt. %.

A spread manufacturing process comprises the steps emulsifying 20–70 wt. % of an aqueous phase with 30–80 wt. % of a fat phase and cooling and working the emulsion to obtain a spreadable emulsion, where the fat phase has been prepared using the hardstock fat as obtained according to the present invention.

The liquid oil part of the fat phase can be any commodity oil generally used for spread manufacture such as rapeseed oil, sunflower oil, soybean oil and mixtures of such oils.

Although the spreads of the invention are prepared preferably with a vegetable fat phase, the invention also comprises spreads where a part of the fat phase has been substituted by dairy fat.

The aqueous phase may have any composition which is common for spread manufacture and which comprises the usual spread ingredients such as water, one or more emulsifiers, gelling and/or thickening agents, salt, colouring agent, flavour, a preservation agent and dairy proteins.

The aqueous phase may also contain a dispersed fat phase so that eventually an O/W/O-emulsion would result which is a subspecies of the spreads according to the present invention.

For the preparation of the spread use is made of common spread manufacturing technology:

Suitably the aqueous phase and the fat phase are prepared by mixing the respective ingredients. Then both phases are emulsified. The crude pre-emulsion is subjected to the usual cooling and working treatments employing scraped surface heat exchangers and pin stirrers so that eventually a plastic spread product is obtained.

Such process employs established technology well known to the man skilled in the art. Details can be found in various textbooks such as K. A. Alexandersen, Margarine Processing Plants and Equipment (Vol.4, Bailey's Industrial Oil and Fat Products, Wiley and Sons Inc., New York 1996).

Preferably the invented spread is prepared with only natural ingredients.

EXAMPLES

The following examples illustrate the invention.

Example 1

High stearic Allanblackia fat is employed for the manufacture of a fat composition according to the invention. The fatty acids composition of the Allanblackia fat is shown in Table 1.

TABLE 1

| Fractions of Fatty Acids of Allanblackia fat (wt. %) | |
|---|---|
| Linoleic acid | 0.5 |
| Oleic acid | 42.2 |
| Stearic acid | 53.9 |
| Arachadic acid | 0.8 |
| Linolenic acid | 0.60 |
| Palmitic acid | 2.0 |
| Others | <0.1 |

60 wt.parts of Allanblackia fat are blended with 40 parts of common palmkernel fat. The mixture is interesterified using a standard procedure for chemical interesterification well known to the man skilled in the art.

Table II shows the fatty acid composition of the resulting interesterified fat.

TABLE II

| Fatty acid | wt. % |
|---|---|
| Caprylic acid | 1.4 |
| Caprotic acid | 1.4 |
| Lauric acid | 19.2 |
| Palmitic acid | 4.6 |
| Stearic acid | 33.4 |
| Arachadic acid | 0.5 |
| Oleic acid | 31.4 |
| Linoleic acid | 1.5 |
| Linolenic acid | 0.4 |
| Others | 6.2 |

The triglycerides composition as established by standard silverphase liquid chromatography and the additional combination of carbon number and fatty acid analysis, is shown in Table III.

The composition of the interesterified fat as illustrated in the above tables will be recognized by the man skilled in the art as being perfectly suited for the manufacture of

TABLE III

| Triglycerides | wt. % |
|---|---|
| HHH | 4.5 |
| HMH + HHM (H2M) | 11.2 |
| HUH + HHU | 11.7 |
| MHM + HMM | 9.3 |
| Rest | 63.3 | spreads products. The good properties are attributed in particular to the steep melting curve of the fat (see Table V) and its good crystallisation behaviour which properties are based on the excellent low ratio of HHH over (HHH+H2M+H2U+HM2) triglycerides and on the presence of a significant fraction of H2M triglycerides. Such triglycerides composition guarantees good manufacturability of spread products.

Example 2

The relevant properties of the hardstock fat as described in example 1 are compared with those of a hardstock fat as traditionally prepared from two natural fats: palm oil and palmkernel fat. The comparison hardstock fat is an interesterified mixture containing 40 weight parts of a dry fractionated palm oil stearin having a melting point of 52° C. and 40 weight parts of the same palmkernel fat as used in example 1. The mixture additionally contains 20 weight parts of rapeseed oil.

For both the fat composition according to the invention and said comparison sample a fat phase is made by blending 50 wt.parts of hardstock fat with 50 wt.parts of rapeseed oil.

The blends have the fatty acid characteristics as shown in Table IV

TABLE IV

| Fatty acid composition | Blend using the fat according to example 1 | Blend using the comparison hardstock fat |
|---|---|---|
| Lauric acid | 9.6% | 9.6% |
| Palmitic acid | 4.5% | 16.6% |
| Stearic acid | 17.5% | 3% |
| Oleic acid | 47.3% | 45.9% |
| Linoleic acid | 10.4% | 13.8% |
| Linolenic acid | 5.1% | 5.9% |
| Others | 5.6% | 5.2% |
| Keys number | 9.3 | 19.7 |

While the nutritional value of the two compositions seems fairly similar, their Keys numbers differ significantly. The undesirably high value 19.7 for the comparison blend dropped to 9.3 for the blend according to the invention which means a substantial health benefit.

Table V shows relevant points of the fat melting curve which is indicative for the functionality of the two blends with respect to product structuring.

TABLE V

| Solid Fat Content according to pulse NMR measurements | Blend according to the invention | Blend for comparison |
|---|---|---|
| SFC 10° C. | 24.4% | 14.6% |
| SFC 20° C. | 13.1% | 7.8% |
| SFC 30° C. | 3.5% | 2.3% |
| SFC 35° C. | 2.2% | 0 |
| SFC 40° C. | 0.5% | 0 |

Although, for both fats the status of naturalness, the types of triglycerides and the level of saturated fatty acids are not essentially different, the data presented above clearly show that the interesterified fat obtained by the invented process is superior when compared with the comparison fat having regard to nutritional value and structuring functionality.

The invention claimed is:

1. A process for the preparation of a triglyceride fat comprising the steps
   selecting a triglyceride fat A and a triglyceride fat B,
   interesterifying a mixture containing fat A and fat B in a ratio chosen from the range 80:20 to 20:80,
where fat A is a fat which is natural and which contains at least 35 wt. % of stearic acid residues and less than 5 wt. % residues of polyunsaturated fatty acids and
where fat B contains at least 40 wt. % of saturated fatty acid residues with a chain length of 12 or 14 carbon atoms, where fat A is selected from the group consisting of Allanbiackia fat, Pentadesma fat, Kokum fat and Sonchy fat.

2. A process according to claim 1, where fat A is Allanbiackia fat.

3. A process according to claim 1, where fat A is Pentadesma fat.

4. A process according to claim 1, where fat A is Kokum fat.

5. A process according to claim 1, where fat A is Sonchy fat.

6. A process according to claim 1, where fat B is a natural fat selected from the group consisting of palm kernel fat, coconut fat and fractions of those fats.

7. A process according to claim 1 where at least one other natural fat comprising liquid vegetable oils and palm oil and palm oil fractions is part of the interesterification mixture.

8. A process according to claim 1, where fat A contains at least 40 wt. % of stearic acid residues.

9. A process according to claim 1, where fat A and fat B are present in the mixture in a ratio chosen from the range 70:30 to 30:70.

10. A process according to claim 1, where fat B contains at least 60 wt. % of saturated fatty acid residues with a chain length of 12 or 14 carbon atoms.

11. A process according to claim 1, where the interesterification process is carried out with a fraction of either fat A or fat B or both.

12. A food product containing the triglyceride fat as obtained according to claim 1.

13. A fat phase suited for the preparation of a W/O-emulsion spread, where the fat phase contains a liquid vegetable oil and 25–80 wt. % of the structuring fat as obtained according to claim 1.

14. A fat phase according to claim 1, where it has a solid fat content as established according to standard pulse NMR techniques being less than 4% at 35° C. and more than 10% at 20° C.

15. A W/O-emulsion spread containing 30–80 wt. % of a fat phase, where the fat phase comprises the structuring fat as obtained according to claim 1.

* * * * *